United States Patent [19]

Legler et al.

[11] 4,356,750
[45] Nov. 2, 1982

[54] BAND SAW TENSION AND TRACKING ASSEMBLY

[75] Inventors: John G. Legler; Robert L. Bartlett, both of Columbia, Mo.

[73] Assignee: Benchmark Tool Company, Jefferson City, Mo.

[21] Appl. No.: 98,554

[22] Filed: Nov. 29, 1979

[51] Int. Cl.³ ............................................. B26D 1/48
[52] U.S. Cl. ...................................... 83/816; 83/817; 83/818
[58] Field of Search ............. 51/135 BT, 148; 83/814, 83/816, 817, 818, 633, 634, 630

[56] References Cited

U.S. PATENT DOCUMENTS

| | | | |
|---|---|---|---|
| 120,949 | 11/1871 | Doane et al. | 83/817 |
| 614,330 | 11/1898 | Morris | 83/633 |
| 1,108,176 | 8/1914 | Hormel | 51/148 |
| 1,756,955 | 5/1930 | Rife | 83/630 |
| 2,624,158 | 1/1953 | Hendrickson | 51/148 |
| 2,640,304 | 6/1953 | McEwan | 51/135 BT |
| 2,742,741 | 4/1956 | Frostad | 51/148 |
| 2,969,815 | 1/1961 | Lasar | 83/818 |

FOREIGN PATENT DOCUMENTS

| | | | |
|---|---|---|---|
| 885475 | 8/1953 | Fed. Rep. of Germany | 83/818 |
| 520220 | 3/1955 | Italy | 83/818 |

Primary Examiner—James M. Meister
Assistant Examiner—K. Bradford Adolphson
Attorney, Agent, or Firm—Biebel, French & Nauman

[57] ABSTRACT

A combined tensioning and tracking assembly is provided for use with band saw tools. A continuous saw band is supported by three spaced-apart pulleys. A bar, supporting one of the pulleys, is mounted for sliding and tilting movement, with the sliding movement providing adjustment in the tension of the saw band, and the tilting movement providing adjustment in the "tracking" of the saw band. The sliding movement of the bar is accomplished through an overcenter arrangement which tensions and releases the saw band. The bar, over center arrangement, and structure for achieving sliding and tilting movement of the bar, are all attached to a bracket which is mounted on the frame of the band saw tool.

12 Claims, 6 Drawing Figures

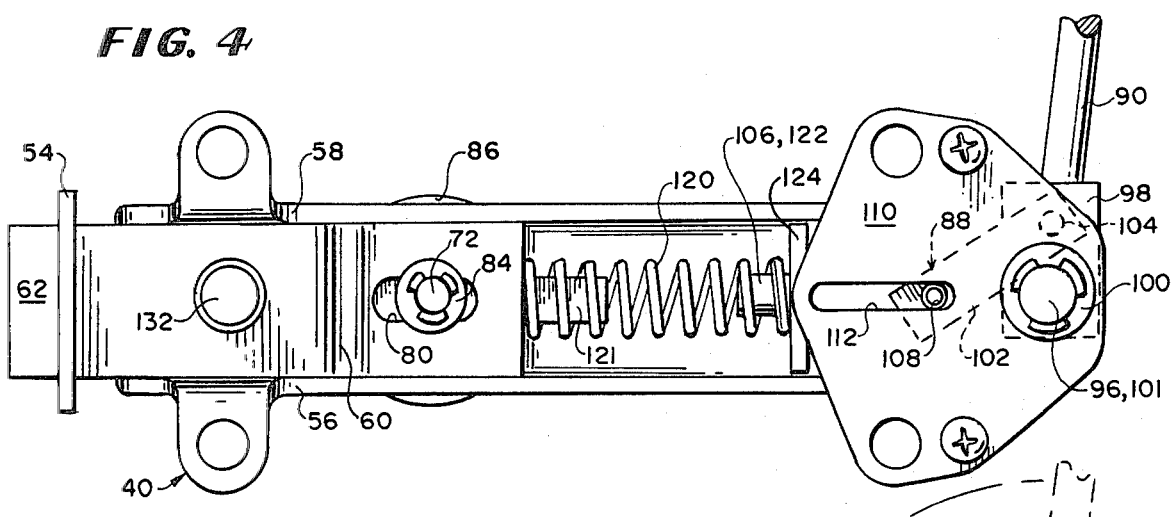
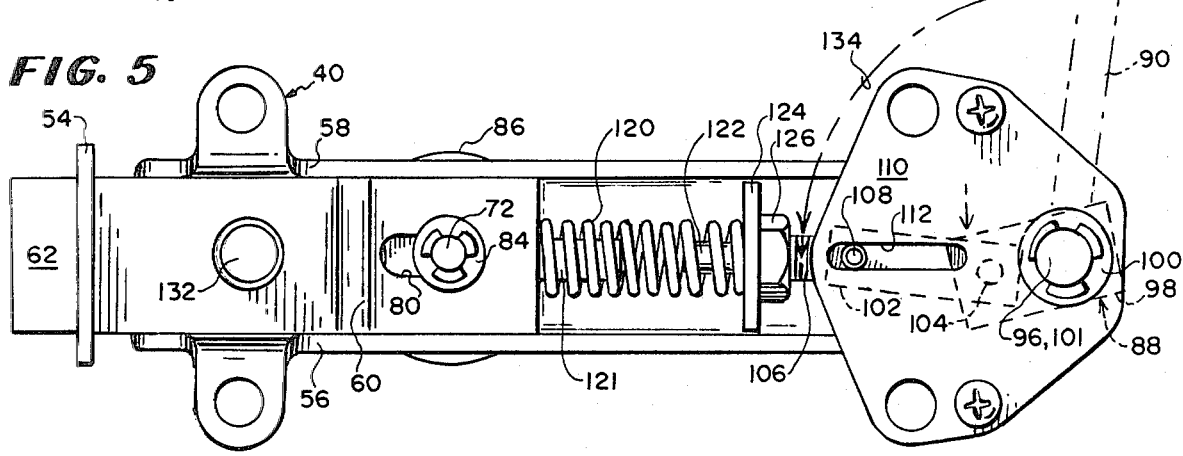
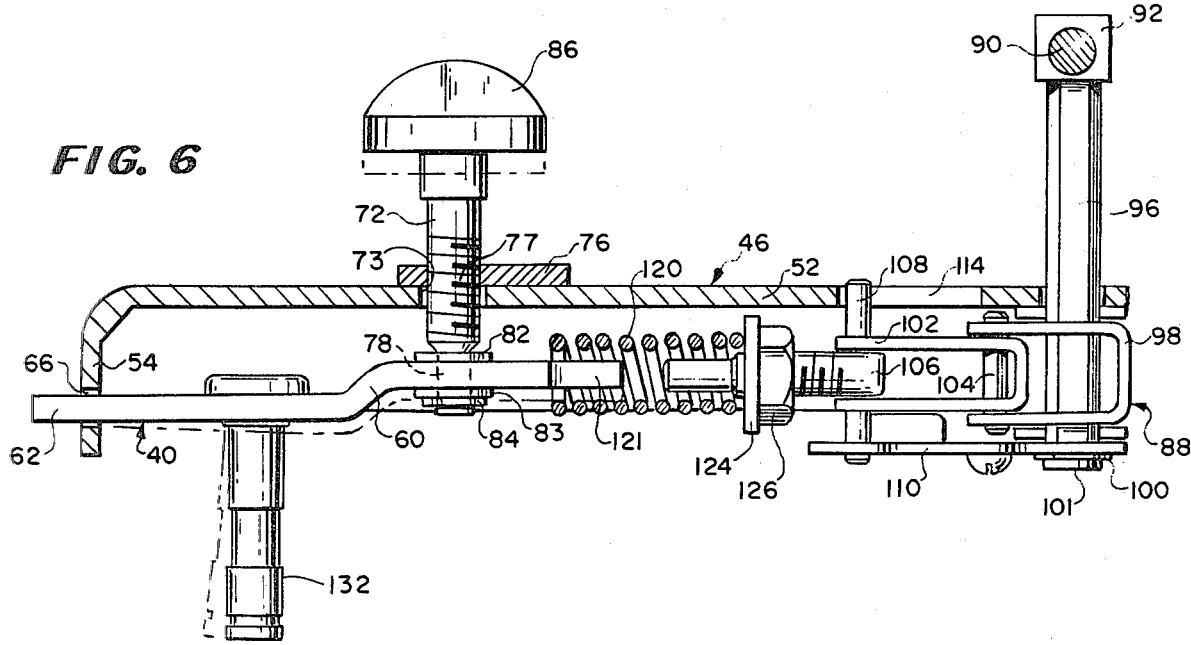

BAND SAW TENSION AND TRACKING ASSEMBLY

BACKGROUND OF THE INVENTION

1. Field of the Invention

This invention pertains to band saw tools, and in particular to means for adjusting both the tension and tracking alignment of the saw band.

2. Description of the Prior Art

State of the art band saws include an endless blade or saw band entrained about a plurality of spaced rollers or pulleys, all arranged in a common plane. One of the pulleys is motor-driven to move the blade along a path through a work station where a work piece may be positioned to be cut by the moving blade.

When using a band saw of the type described, it is important that proper tension be maintained on the blade, since a minimum amount of tension is required for cutting through a work piece. Conversely, too great a tension applied to the saw band can shorten the life thereof. Further, it is recommended that when the saw band is not in use, the tension thereon be released in order to prevent fatiguing of the saw band, thereby prolonging the life thereof.

Conventionally, in saw band tools of the type described, one of the pulleys supporting the saw band is moved along a common plane, into and out of engagement with the saw band, so as to apply and remove tension on the saw band, respectively. The tension adjustment of the band saw tool usually includes a tension adjusting screw which is manually rotatable to incrementally advance the movable pulley in first and second directions, so as to incrementally increase or decrease tension on the saw band. With this mechanism, tensioning adjustments must be made every time the band saw tool is returned to use, if fatigue of the saw band is to be avoided. Also, adjustments to the saw band tension must be made every time a saw band is replaced. This adjusting operation, using tension adjusting screws and the like can be time consuming, and makes it difficult to accurately provide a predetermined tension on the saw band each time the band saw tool is returned to service.

While the pulleys of the saw band tool are arranged in generally coplanar fashion, the slightest deviation or misalignment of any one pulley from the common plane may cause the saw band to shift in directions transverse to the common plane, so as to become either partially or completely disengaged from the pulleys upon which it is entrained. The ability of the saw band to remain in contact with the support pulleys, and to run steadily along the common plane defined by the support pulleys of the band saw tool is commonly known as "tracking." Any tendency of the saw band to shift laterally with respect to the plane of the pulleys is known as "tracking error." It is generally desirable to eliminate "tracking error" of the saw band so as to maintain the cutting efficiency of the band saw tool, as well as to prolong the life of the saw band. Any "tracking error" attributed to the band saw tool operation, is in fact the cumulative total of "tracking error" produced by all the elements comprising the pulley assembly of the band saw tool.

To minimize "tracking error" in a band saw tool, it is common to mount one of the pulleys about which the saw band is entrained, for adjustable deflection, in that its supporting shaft is made tiltable from directions normal to the common plane. Thus, "tracking error" is dynamically balanced by the tilting adjustment of one pulley, to virtually eliminate lateral shifting of the saw band as it rotates over the plurality of pulleys. To accomplish the latter, in some band saw tools, a major adjustment is required. Other band saw tools include less complicated, but separate adjusting screws for repositioning one of the pulleys on which the blade is mounted.

While the various tensioning and "tracking" mechanisms described heretofore operate successfully for the most part to accomplish their intended results, the provision of separate mechanisms for tensioning and "tracking" of a band saw blade becomes complicated and quite costly. Furthermore, in use, such separate tension and "tracking" mechanisms often make it difficult to eliminate the effect of the adjustment of one mechanism upon the other.

SUMMARY OF THE INVENTION

Accordingly, it is a primary object of the present invention to provide in a band saw tool of the type described, a new and improved assembly for adjusting both tension and "tracking" of the saw band thereof.

It is another object of the present invention to provide in a band saw tool, a blade tension adjustment assembly which quickly releases and restores blade tension to a predetermined setting.

It is still another object of the present invention to provide a mechanism for adjusting both the tension and "tracking" of the saw band or blade in a band saw tool, which mechanism is relatively simple in construction, self contained, easy to install, and effective in restoring a predetermined tension by simple manual adjustment.

Briefly, a preferred embodiment of the band saw tension and tracking adjustment mechanism according the invention includes a support bracket mounted on the frame of a band saw tool which includes a plurality of spaced-apart pulleys arranged to lie in a common plane and about which an endless blade or saw band is entrained. An elongated bar member is mounted on the bracket for tilting and sliding movement transverse to, and along a plane parallel to the common plane, respectively. A support shaft for one of the plurality of pulleys of the band saw tool is mounted on and extends perpendicular to the bar. The bar is coupled to an overcenter toggle linkage by a coil spring. A pivotally mounted handle, joined to the toggle linkage, is manually operable between first and second positions to move one of the pulleys between first and second positions lying in the common plane of the band saw pulleys, for tensioning and relaxing, respectively, the saw band.

A "tracking" adjustment screw threadingly engages the bracket and is attached at a free end to the pulley support bar. Rotation of the screw tilts the bar to in turn adjustably tilt the one pulley transverse to the common plane of the pulleys thereby providing proper "tracking" of the endless saw band thereon. The adjustment screw also supports the bar for sliding movement thereof as the saw band is tensioned and relaxed.

These together with additional features, objects and advantages will become apparent from the following, wherein the details of construction and operation are more fully described and claimed. Reference is made to the accompanying drawings forming a part hereof wherein like numerals refer to like parts throughout.

BRIEF DESCRIPTION OF THE DRAWINGS

In the drawings:

FIGS. 4 and 5 are side views of the tensioning and tracking assembly according to the invention shown in relaxed and tensioned positions, respectively; and FIG. 6 is a cross sectional, plan view of the tensioning and tracking assembly according to the invention, illustrating the operation of the tracking portion thereof.

DETAILED DESCRIPTION OF THE PREFERRED EMBODIMENT

Figure 1:
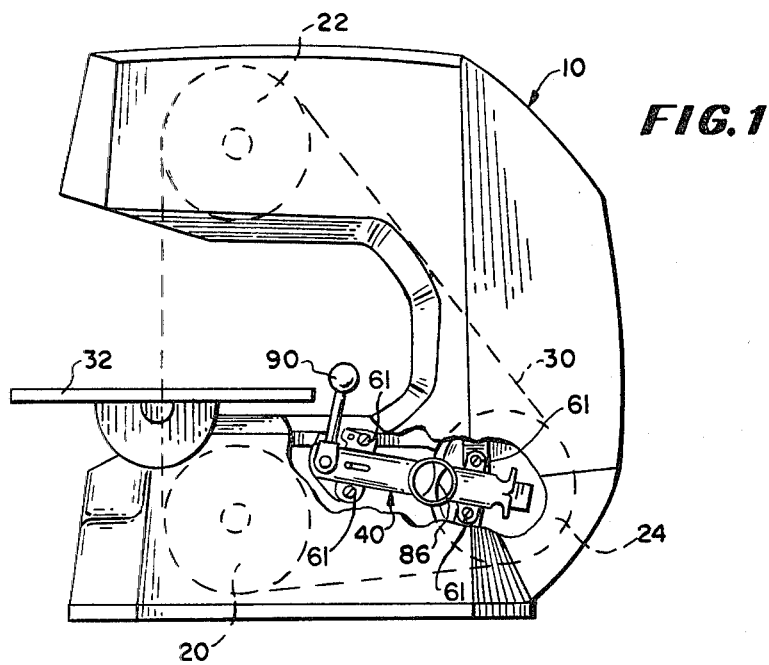
FIG. 1 is a side elevational view of a band saw tool including a saw band tensioning and "tracking" assembly according to the invention.
Figure 2:
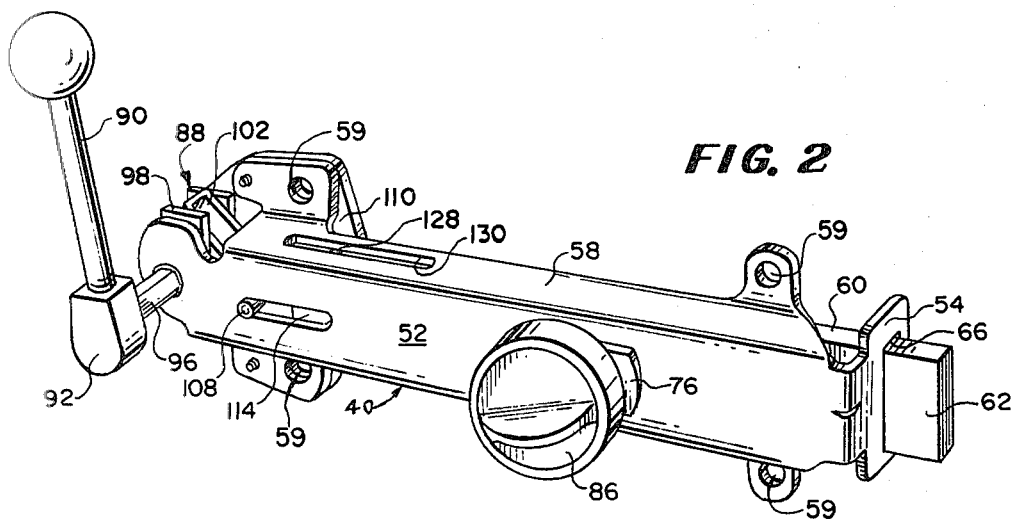
FIGS. 2 and 3 are enlarged, perspective views of the tensioning and tracking assembly of FIG. 1.
Figure 3:
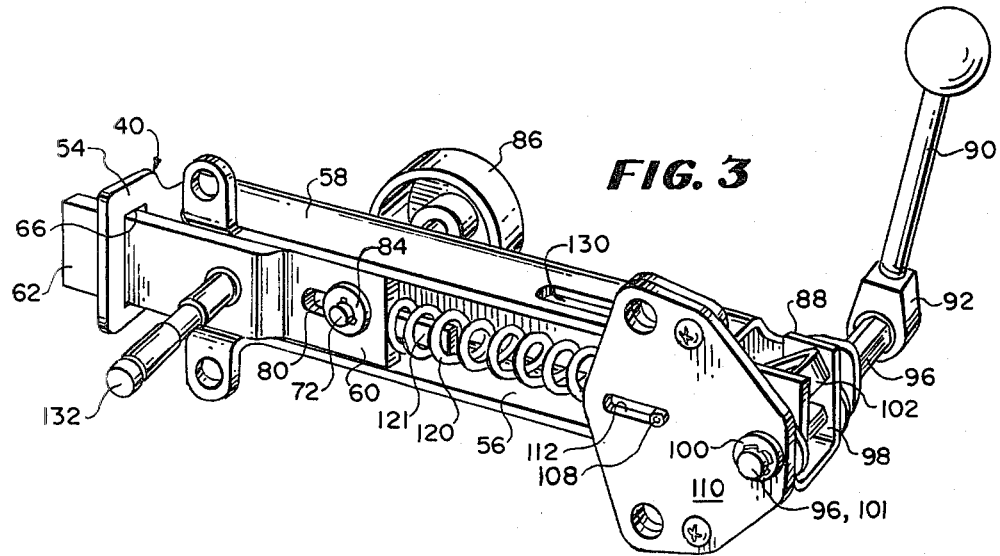

Referring now to FIG. 1, band saw tool 10 comprises three spaced-apart pulleys 20, 22, and 24, which are arranged, along with a continuous saw band 30, in a common plane, hereafter called the reference plane. Driven pulley 20 propels saw band 30 over pulleys 22 and 24 in a continuous path which, owing to the rigidity of saw band 30, is parallel to the reference plane.

Saw band 30, which is shown in profile in FIG. 1, has a substantial width, with saw teeth formed at least along one edge thereof for cutting work pieces which are moved in directions normal to the reference plane. Work pieces are supported by table 32, which table assists the operator in feeding items to be cut in a direction perpendicular to the reference plane. The inner surface of saw band 30 rides along and is supported by the peripheral surfaces of pulleys 20, 22, and 24, all of which are dimensioned to support the full width of the saw band. While the pulleys 20, 22, 24 are arranged in generally coplanar fashion, deviation or misalignment of any one pulley from the reference plane may cause saw band 30 to shift in directions normal to the reference plane so as to become either partially or completely disengaged from the pulleys upon which it is entrained, thereby causing "tracking error."

The shafts upon which the pulleys 20, 22, and 24, are rotatably mounted, are aligned generally perpendicular to the reference plane. To eliminate "tracking error", pulley 24 is made to be adjustably deflectable, in that its supporting shaft is tiltable from directions normal to the reference plane. The total tracking error of the three pulleys is dynamically balanced by the tilting adjustment of pulley 24, thereby eliminating lateral shifting of the saw band as it passes along pulleys 20, 22, and 24.

In the band saw tool 10 of FIG. 1, pulley 24 is also movable along the reference plane to adjust the tension of saw band 30. When pulley 24 is moved outwardly, away from pulleys 20, 22, so as to engage saw band 30, tension on saw band 30 is increased. Any tilting of the shaft upon which pulley 24 is mounted during tension adjustment would result in a "tracking error" of the saw band 30 and would disturb the optimum operation of the tool 10. Therefore, it is important that the alignment of the shaft for pulley 24 normal to the reference plane be maintained, as the tension of saw band 30 is adjusted.

With reference to FIG. 1, the band saw tool 10 is shown partially broken away to reveal the tensioning and tracking assembly 40 of this invention which provides adjustments for "tracking error", as well as the tensioning of saw band 30. Referring now to FIGS. 2 through 6, the construction of assembly 40 will be described. The assembly 40 includes a bracket 46 having a top wall 52, end wall 54, and side walls 56, 58. Bracket 46 is also provided with openings 59, through which fastening means 61 pass to secure the bracket to the band saw as seen in FIG. 1 of the drawings. A bar 60, see FIGS. 4 and 5, is slidably mounted on bracket 46 for movement between side walls 56, 58, along top wall 52, and through end wall 54 thereof. The free end or tongue portion 62 of bar 60 is inserted through aperture 66 formed in end wall 54 of bracket 46. The end of bar 60 opposite tongue portion 62 is slotted to receive one end of a threaded shaft 72 which extends through an aperture 73 formed in top wall 52 of bracket 46 (FIG. 6). A nut 76, overlying aperture 73, is welded to the upper bracket wall 52. Shaft 72 includes a portion 77 threadingly engaged with nut 76, and a necked portion 78 which is received in slot 80 of bar 60, to provide sliding engagement between shaft 72 and bar 60. Washers 82, 83 are provided on either side of bar 60 to further assist the sliding engagement of shaft 72 with bar 60. A locking ring or retainer 84 maintains the coupling of bar 60, washers 82, 83, and shaft 72. A tracking adjustment knob 86 is joined to shaft 72 for manual rotation of the shaft within nut 76. Rotation of shaft 72 pivots or tilts bar 60 about tongue portion 62 so as to cause saw band 30 to shift laterally during operation of the band saw tool, thereby providing means for eliminating any "tracking error" of the saw band 30.

Referring now to FIGS. 2-6, bar 60 is moved by an overcenter toggle arrangement 88 which, in conjunction with other linkage, connects bar 60 to an operating handle 90. Handle 90 is secured to hub 92, which in turn is rigidly secured by a press fit or the like to drive shaft 96. As is shown most clearly in FIG. 6, drive shaft 96 is inserted through drive link 98 and is held in place by retainer 100 which engages the free end 101 of drive shaft 96. Drive link 98 is pivotally connected to intermediate link 102 by a pin 104. Intermediate link 102 is in turn secured to threaded shaft 106 by pin 108, wherein intermediate link 102 serves as a yoke for receiving shaft 106. Links 98, 102, and pins 104, 108 comprise the overcenter arrangement 88 which connects handle 90 to threaded shaft 106. A support plate 110 defining a slot 112, receives one end of pin 108 and, along with slot 114 formed in bracket wall 52, provides sliding support for pin 108 as the pin moves longitudinally along the bracket.

A helical spring 120 interconnects bar 60 with shaft 106. A first end of spring 120 receives a reduced cross sectional portion 121 of bar 60, and a second end receives a cylindrical portion 122 of shaft 106. Spring 120, in combination with the overcenter arrangement 88, mechanically interconnects drive shaft 96 with bar 60. Spring 120 is retained by washer 124, held in fixed relation to shaft 106, by nut 126. Washer 124 has transversely extending ears or track followers 128 which ride in elongated slots or tracks 130 formed in side walls 56, 58 of bracket 46. The engagement of track followers 128 and tracks 130 provides continuous alignment of shaft 106 as it moves in response to the advancement of handle 90 between first and second positions so as to tension and relax the saw band. The positioning of nut 126 along shaft 106 selectively presets, through spring 120, the tension force applied to the saw band 30.

Referring now to FIG. 6, tracking adjustment of the band saw is made by turning knob 86, to change the position of end 121 of lever 60, thereby causing the tongue portion 62 thereof to fulcrum about end wall 54 of bracket 46. Pulley shaft 132, which is press-fitted or otherwise ridgidly secured to lever 60, is swung in an arc as end 121 of lever 60 is moved. Pulley 24, which is mounted on shaft 132, is thereby moved at angles to the reference plane to effect a tracking adjustment of saw band 30.

Referring now to FIGS. 4 and 5, the tensioning adjustment of assembly 40 will now be described. FIG. 4 shows the assembly 40 in a relaxed position, corresponding to a first postion of handle 90. As handle 90 is advanced in the direction of arrow 134, assembly 40 assumes a fully tensioned position as shown in FIG. 5. As handle 90 is advanced to tension the saw band, overcenter toggle arrangement 88 moves from a retracted position, see FIG. 4, to an extended position, see FIG. 5, thereby compressing helical spring 120 to extend bar 60 and to thereafter maintain bar 60 under the force of compression spring 120. As bar 60, and shaft 132 attached thereto, are extended, pulley 24 is moved away from pulleys 20, 22 to engage and thereafter apply a predetermined tension to the saw band. As is shown most clearly in FIGS. 5 and 6, by advancing nut 126 along shaft 106, the amount of compression of spring 120 can be adjusted to produce a corresponding adjustment of the tension applied to the saw band.

The arrangement of assembly 40 set forth above provides improved tracking stability wherein the tracking adjustment of bar 60 and shaft 132 is maintained constant throughout the full range of tension adjustment. Further, with the arrangement of this invention, a predetermined tension is readily removed and precisely restored by simple movement of handle 90 between first and second positions. The single assembly provides both tension and "tracking" adjustment of the saw band.

While a preferred embodiment of this invention has been illustrated and described, it will be recognized that the invention may be otherwise variously embodied in practice, within the scope of the following claims.

What is claimed is:

1. For use with a band saw of the type having a plurality of spaced pulleys positioned to lie in a common plane and a saw band entrained about the pulleys for movement along a path in the plane defined by the pulleys, a tension and tracking assembly comprising:
   a movable support member including an elongated bar having a shaft extending therefrom, said shaft shaped to receive a pulley for rotation with respect thereto;
   bracket means including a top wall, an end wall defining a slot for reception of said bar to provide sliding engagement of said bar with respect to said end wall, and at least two side walls, said side walls having elongated tracks defined therein;
   sliding means including an overcenter toggle arrangement extending from said bracket means to said bar, operable between first and second positions to displace said movable support member in first and second directions to relax and tension, respectively, a saw band, bias means coupling said bar to said overcenter toggle arrangement, said bias means urging said bar such that a pulley mounted on said shaft is urged into engagement with a saw band in response to said overcenter toggle arrangement being operated to said first position, and track follower means which engage said tracks of said bracket side walls to provide alignment of said bar as it is displaced relative to said bracket.

2. The tension and tracking assembly of claim 1 wherein said tilting means includes an elongated coupling member coupled to said bar for providing tilting support therefor, and said top wall includes means for receiving said coupling member, such that advancement of said coupling member in first and second directions deflects said bar and said shaft to tilt a pulley mounted on said shaft.

3. The tension and tracking assembly of claim 1 wherein said biasing means comprises a spring having first and second ends, said first end of said spring coupled to said bar, and said overcenter toggle arrangement includes a spring support member coupled to said second end of said spring to provide support and alignment for said spring during operation of said overcenter toggle arrangement.

4. The tension and tracking assembly of claim 3 wherein said spring support member includes a washer, and said track follower means includes outwardly extending ears formed on said washer.

5. The tension and tracking assembly of claim 4 wherein said spring support member includes a threaded shaft portion and a nut threadingly engaged to said threaded shaft portion, said washer disposed between said nut and said second end of said coil spring, such that said nut may be advanced along said threaded shaft portion of said spring support member in predetermined amounts to compress said coil spring a predetermined amount when said overcenter toggle arrangement is operated between said first and second positions.

6. The tension and tracking of claim 5 wherein said coupling member is coupled to said bar to provide tiltable movement for said bar while supporting said bar for slidable movement with respect thereto, to thereby apply and remove tension to a saw band entrained about a pulley carried on said shaft, as well as to tilt a pulley carried on said shaft.

7. The tension and tracking assembly of claim 5 wherein said coupling member includes a threaded shaft having a threaded portion and a necked portion, and said bar includes a slotted portion for receiving said necked portion of said threaded shaft whereby said threaded shaft is coupled to said bar to provide tiltable movement therefor while supporting said bar for slidable movement with respect thereto.

8. In combination with a band saw of the type having a continuous saw band and a plurality of spaced pulleys positioned to lie in a common plane, said saw band entrained about said pulleys for movement along a path in said plane defined by said pulleys, an improved tension and tracking assembly comprising:
   a movable support member including an elongated bar having a shaft extending therefrom, said shaft shaped to receive a first pulley for rotation with respect thereto;
   bracket means including a top wall and an end wall defining a slot for reception of said bar to provide sliding engagement of said bar with respect to said end wall;
   sliding means including an overcenter toggle arrangement extending from said bracket means to said bar, operable between first and second positions to displace said movable support member and said first pulley and first and second directions to relax and tension, respectively, said saw band extending about said plurality of spaced pulleys, bias means coupling said bar to said overcenter toggle arrangement, said bias means urging said bar such that said first pulley is urged into engagement with said saw band in response to said overcenter toggle arrangement being operated to said first position, thereby tensioning said saw band;

tilting means including an elongated coupling member extending between said bar and said bracket for providing tilting support therefor, and having a threaded shaft including a threaded portion and a necked portion, said top wall including means for receiving said coupling member such that advancement of said coupling member in first and second directions deflects said bar and said shaft to tilt said first pulley mounted on said shaft relative to said common plane, and said bar defining a slotted portion for receiving said necked portion of said threaded shaft whereby said threaded shaft is coupled to said bar to provide tiltable movement therefor while supporting said bar for slidable movement with respect thereto.

9. The band saw of claim 8 wherein said bracket further includes at least two side walls, said side walls having elongated tracks defined therein, and said overcenter toggle arrangement includes track follower means which engage said tracks of said bracket side walls to provide alignment of said bar as it is displaced relative to said bracket by said sliding means.

10. The band saw of claim 9 wherein said biasing means comprises a spring having first and second ends, said first end of said spring coupled to said bar, and said overcenter toggle arrangement includes a spring support member coupled to said second end of said spring to provide support and alignment for said spring during operation of said overcenter toggle arrangement.

11. The band saw of claim 10 wherein said spring support member includes a washer, and said track follower means includes outwardly extending ears formed on said washer.

12. The band saw of claim 11 wherein said spring support member includes a threaded shaft portion and a nut threadingly engaged to said threaded shaft portion, said washer disposed between said nut and said second end of said coil spring, such that said nut may be advanced along said threaded shaft portion of said spring support member in predetermined amounts to compress said coil spring a predetermined amount when said overcenter toggle arrangement is operated between said first and second positions.

* * * * *